United States Patent
Alpers

[11] 3,902,685
[45] Sept. 2, 1975

[54] ANGLE GATING
[75] Inventor: Frederick C. Alpers, Riverside, Calif.
[73] Assignee: The United States of America as represented by the Secretary of the Navy, Washington, D.C.
[22] Filed: Feb. 24, 1964
[21] Appl. No.: 347,091

[52] U.S. Cl. ............................................. 244/3.19
[51] Int. Cl. ........................................... F42b 15/02
[58] Field of Search ............ 73/178; 244/14 H, 14 I, 244/3.16, 3.17, 3.19; 250/203; 343/7.3, 7

[56]         References Cited
         UNITED STATES PATENTS
2,581,589   1/1952   Herbst ........................ 244/3.16 UX
2,911,167   11/1959  Null et al. .................... 244/3.16 X
2,917,737   12/1959  Close et al. ....................... 343/7.3
3,015,817   1/1962   Pastorizd .......................... 343/7.3
3,109,170   10/1963  Greene, Jr. et al. ................ 343/7 X
3,142,057   7/1964   Deri ................................ 343/7.3 X
3,177,485   4/1965   Taylor, Jr. ........................ 343/7 X
3,182,320   5/1965   Frank ............................... 343/7.3 X
3,197,770   7/1965   Rix et al. .......................... 343/7.3 X Primary Examiner—Verlin R. Pendegrass
Attorney, Agent, or Firm— Richard S. Sciascia; J. M. St. Amand; T. M. Phillips

EXEMPLARY CLAIM

1. For use in a guided missile system of the conical scanning type an angle gating system comprising:
   a. a first input terminal for receiving a sine wave signal generated by the conical scanning of the seeker antenna in the direction of a target to be tracked,
   b. a second input terminal for receiving a sine wave reference signal representing the instantaneous position of the scanning device,
   c. a third input terminal for receiving a sine wave reference signal shifted ninety degrees in phase from the phase of the sine wave signal received at said second input terminal,
   d. right-left modulator circuit means coupled to said second input terminal for producing an output sine wave,
   e. up-down modulator circuit means coupled to said third input terminal for producing an output sine wave that is ninety degrees out-of-phase with the output sine wave from said right-left modulator,
   f. a summing network coupled to the outputs of said right-left and up-down modulator circuits means for generating an output sine wave memory signal,
   g. comparator circuit means coupled to said first input terminal and to the output of said summing network for generating an output signal whenever the amplitudes of the two inputs are of unequal values of a predetermined amount.

3 Claims, 2 Drawing Figures

FREDERICK C. ALPERS
INVENTOR.

ATTORNEYS

ANGLE GATING

The invention herein described may be manufactured and used by or for the Government of the United States of America for governmental purposes without the payment of any royalties thereon or therefor.

The present invention relates to angle gating circuits and more particularly to angle gating circuits which discriminate against extraneous targets without an increase in the receiving aperture or antenna size of tracking radars, missile seekers, or other devices which are used to measure the angular coordinates of a target.

Present systems used for measuring the angular coordinates of one of a number of possible targets tend to discriminate between possible targets chiefly on the basis of a target's being within or not within the radar or optical receiving pattern (or "beam") associated with the device. The angular discrimination that is possible is then limited by the wavelength of the radiation used and the physical size that is permissible for the aperture or antenna of the device. The present invention provides a way to provide increased angular discrimination against extraneous targets.

In missile seekers which provide homing guidance against specific targets and in fire control radars which track targets, problems occasionally arise when more than one target is present or when the target is isolated but counter-measures equipment is operating elsewhere in the area. The problem is that of singling out the signals pertaining to the particular target that is desired and excluding other extraneous information from the directional control circuitry of the seeker or fire control device. This multiple target and/or off-target jamming problem is especially evident in situations when the extraneous source may present a signal which is much higher in power than the signal from the true target that is desired.

Prior approaches to the solution of the problem have been that of reducing the effective beam width of the seeker or fire control receiving antenna. With a fire control device this solution may be acceptable since large antennas can be used which give narrow beams which tend to exclude extraneous signals from sources separated a significant distance from the desired target, but with missile seekers, where space is limited, reducing the beam width to the desired extent is not feasible because this would require larger antenna diameters than can be tolerated.

The present invention provides a means to achieve the selectivity which would be afforded by a narrow beam width in such a seeker or tracking device without requiring a change in size of the antenna.

In a missile system the angle gating equipment which accomplishes the angle gating function is placed between the guidance and autopilot subsystems of the missile. Assorted signals from the guidance equipment are delivered to the angle gating circuit and in this circuit a comparison is made of the direction from which these signals come. The basis for determining this direction is provided by the guidance circuit. That is, in guidance circuitry of various presently known types some phase, amplitude, or other relationship in the signals received is used as a basis for indicating the direction from which the various signals have come. In the present invention each signal is compared with stored information in the angle gating circuit to determine if it comes from the direction of the desired target. The comparison results in the signal either being accepted as one which originates from the desired target, or being rejected as one which originates from an extraneous target and is of no interest in the particular guidance or missile homing function being carried out. In the present invention, the angel gating circuit uses a feedback from the autopilot to give a spacial correction in the event that the whole missile has reoriented itself so that past information is no longer correct with respect to the new missile axes. It also uses a feedback from its own output to establish the memory of what the target position was with respect to the missile axes.

An object of the present invention is to provide an improved angular discrimination means which will discriminate against extraneous targets.

Another object of the invention is to provide an improved angular discrimination means which will discriminate against extraneous targets without the increase in size of the receiving antenna.

A further object of the invention is to provide an improved angular discrimination which compares the received signal with stored information in the angle gating circuit to determine if the received signal comes from the direction of the desired target.

Other objects and many of the attendant advantages of this invention will become readily appreciated as the same becomes better understood by reference to the following detailed description when considered in connection with the accompanying drawings wherein.

Figure 1:
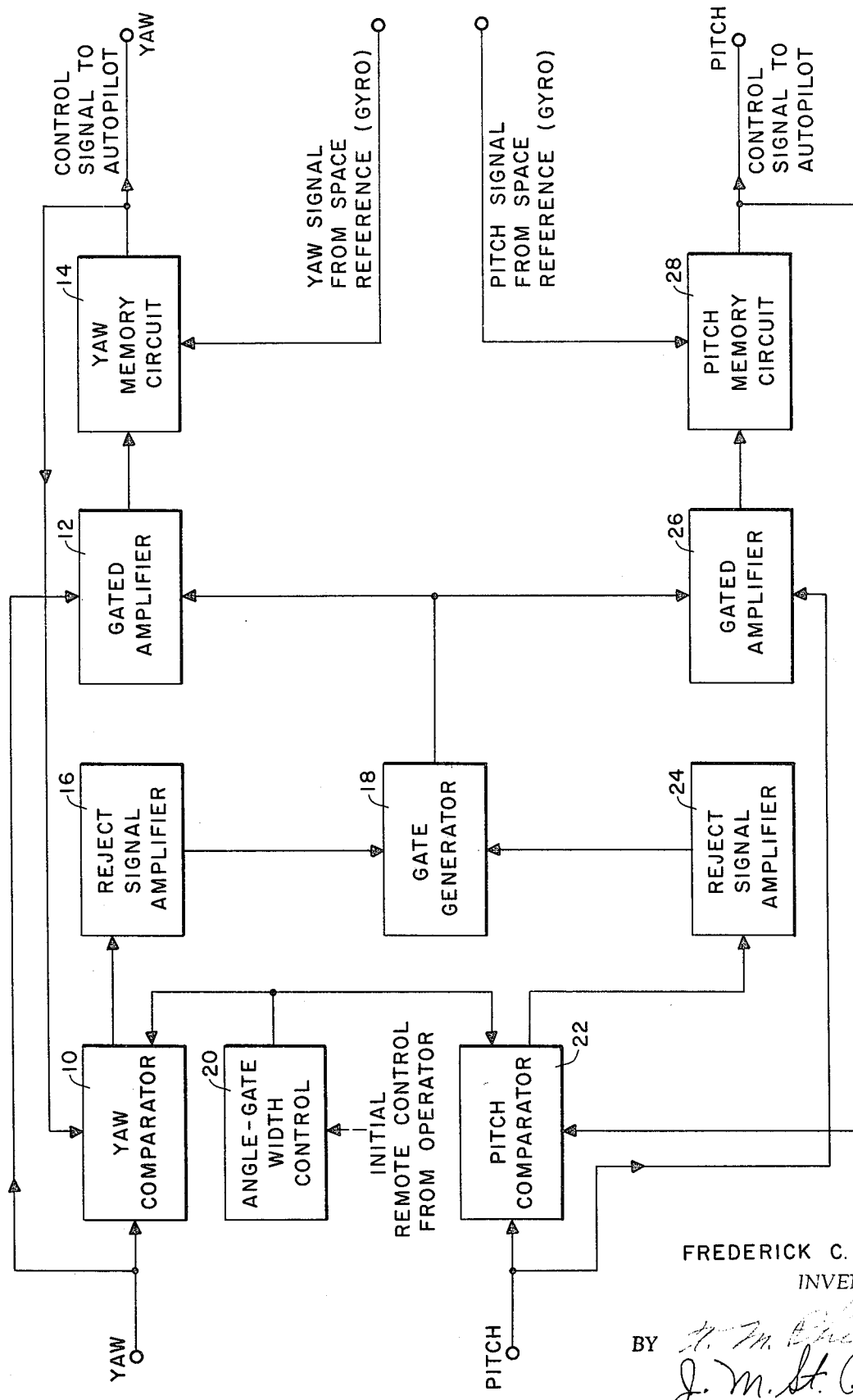
FIG. 1 is a block diagram of an angle gating circuit which functions with a monopulse type missile seeker.

Referring now to the drawings, there is shown in FIG. 1 an angle gating circuit which functions with a monopulse type missile seeker. The inputs to this circuit are yaw and pitch signals from a monopulse seeker (not shown). Each of these two signals are processed in identical but separate channels.

The yaw signal from the seeker unit (not shown) is supplied to a yaw comparator 10 and gated amplifier 12. Comparator 10 compares each yaw signal with the output of yaw memory circuit 14 to determine whether the direction of that signal is the same as the output yaw information from previous angle gating operations, i.e., it compares each new signal with a remembered signal which was an earlier yaw output signal passed by the angle gating circuitry. If the compared signals are sufficiently close to being equal to indicate that the new yaw signal does originate from the target previously tracked, there is no output from comparator 10. If the two input signals to comparator 10 are unequal, an output signal is fed to reject signal amplifier 16. After amplification, the output signal from amplifier 16 is fed as a trigger to gate generator 18, the output of which is fed to gated amplifier 12. A third signal is fed into yaw comparator 10 from angle-gate width control 20. This is to provide the initial setting of comparator 10 when there is no memory of a previous target upon which to base a comparison, and to control the width of the acceptance of equality-of-signal region, i.e., it controls how much inequality is permitted in comparator 10 before it generates an output. When a gate signal appears at generator 18, amplifier 12 is blocked to prevent the yaw signal input from being passed. For acceptable yaw signals which are not gated out, the output from amplifier 12 then passes to yaw memory circuit 14. The output from memory circuit 14 is fed as a control signal to the autopilot (not shown).

A space reference signal is also fed into yaw memory circuit 14 from a suitable space reference source which may be the gyro of the autopilot. The space reference signal is to provide stability to the yaw signal when the missile axis may have changed position in the space reference system due to quick turn to rolling of the missile.

The pitch channel has a pitch comparator 22, reject signal amplifier 24, gated amplifier 26 and pitch memory circuit 28 and functions identically to that of the yaw channel. Both comparators 10 and 22 feed gate generator 18 and both gated amplifiers are controlled by gate generator 18. This assures that an off-target signal in yaw is not permitted to introduce any pitch correction into either the autopilot or the pitch memory. If such were not the case, an extraneous signal which was only off target substantially in one plane could gradually cause an error in the other plane through affecting the feedback from the memory circuit in the plane.

Where it is not convenient to separate the pitch and yaw channels prior to the angle gating function as described above, the circuit of FIG. 2 is employed. The inputs to this circuit are normalized scan signals, which are the output of the seeker video division circuitry and quadrature signals from a reference generator geared to the seeker scanning system. All of these signals are essentially sine waves. The first has an amplitude which is proportional to the angle between the seeker axis and the source of incoming radiation, and of a phase dependent upon the direction (up, down, right or left) of the source with respect to the seeker. The latter two are signals of fixed amplitude whose phases are indicative of the instantaneous direction of scanning.

The input reference generator waveforms are used in right-left and up-down modulator circuits to build up a sine wave which is the directional memory signal used by the seeker as the basis for angle gating. To do this the output directional information showing the previous position of the target is used to control the sine wave amplitude corresponding to each scanning quadrant. The right-left and up-down modulators build up respective sine wave difference signals which are 90° out-of-phase with each other and which are shifted 180° in-phase by any shifting of the signal source from one side of the seeker axis to the other. The two sine wave signals in quadrature are summed in a summing network to give the sine wave memory signal previously mentioned, and this signal then has an amplitude proportional to the target bearing with respect to the seeker axis and a phase indicative of the relative direction of the target.

Figure 2:
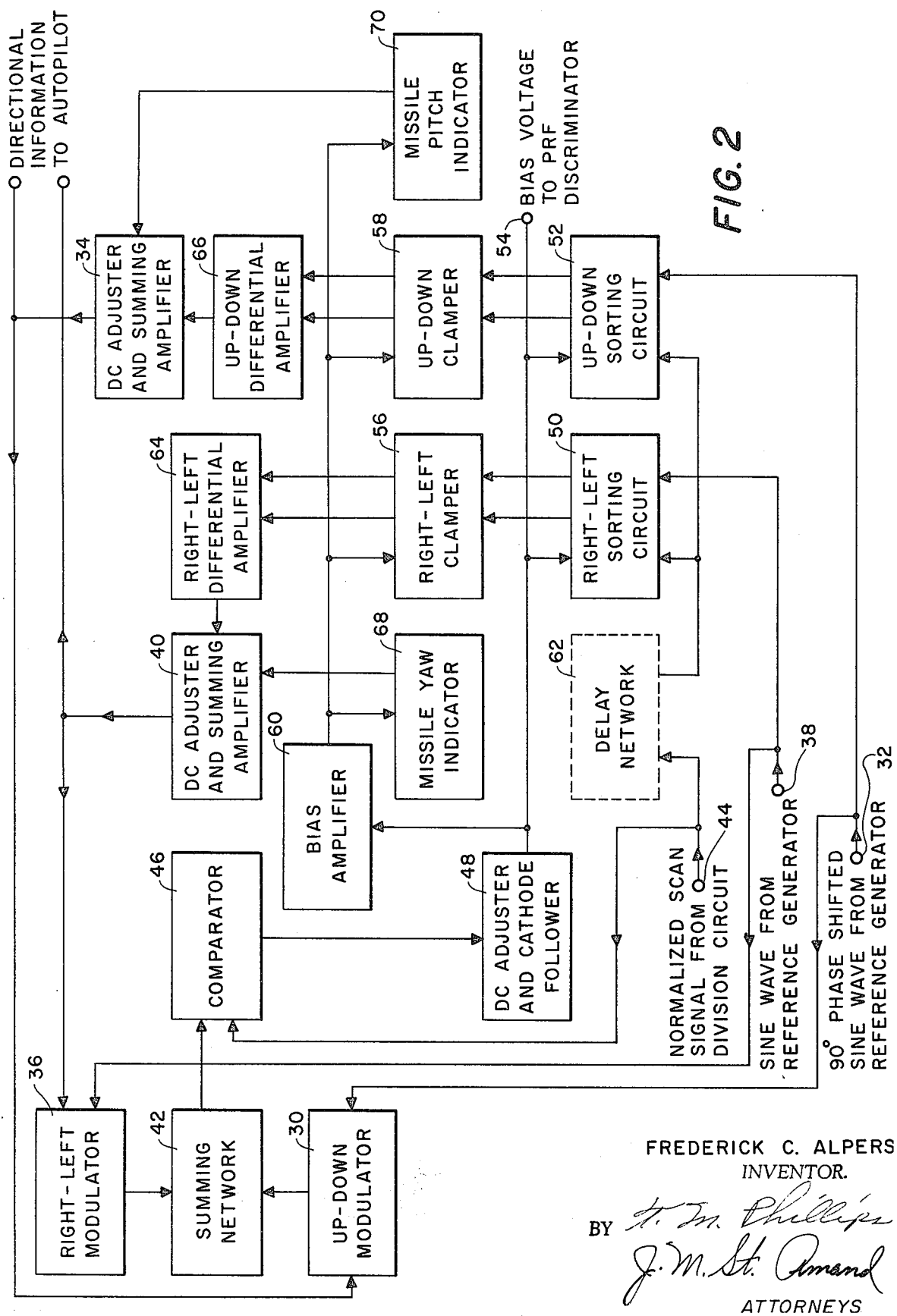
FIG. 2 is a block diagram of an angle gating circuit which functions with a seeker using conical scan technique or for a seeker in a continuously rolling missile.

Referring now to FIG. 2 there is shown an up-down modulator 30 having a first input from input terminal 32 which is the 90° phase shifted wave from reference generator on the seeker (not shown) and a feedback input from DC adjuster and summing amplifier 34. Right-left modulator 36 has a first input from input terminal 38 which is the sine wave from reference generator on the seeker and a feedback input from DC adjuster and summing amplifier 40. The outputs of modulators 30 and 36 are fed into summing network 42 which provides an output sine wave memory signal.

The sine wave signal comprising the input scanning information from input terminal 44 and the sine wave memory signal from summing network 42 are compared in comparator 46 which may be of the differential amplifier type. Comparator 46 gives an output signal whenever the amplitudes or phases (or both) of the two inputs are not approximately the same. Comparator 46 is adjusted so that the output signal is of a fixed polarity regardless of the direction of the difference in phase or amplitudes of the input signals. The output of comparator 46 is fed into a DC adjuster and cathode follower circuit 48 which establishes the signal at the proper voltage level for the control of later circuit elements through biasing. Circuits directly controlled are the right-left sorting circuit 50 and up-down sorting circuit 52. The output from cathode follower circuit 48 also provides a signal to the PRF discriminator circuit (not shown) at terminal 54. The overall action effected by this arrangement is one in which a sudden dissimilarity between the scan signal and the sine wave memory signal results in a change of bias which prevents signals from passing through the right-left and up-down sorting circuits 50 and 52, and which causes the PRF discriminator circuitry to seek another input signal that will give identical sine waves and cause the bias (output from cathode follower 48) to disappear. By this action, signals from off-target sources are prevented from generating directional information and from taking over control of the PRF discriminator to achieve an exclusion of the desired signal.

Right-left sorting circuit 50 permits a portion of the sine wave from terminal 44 to pass to clamping circuit 56. In a similar manner up-down sorting circuit permits a portion of sine wave from terminal 44 to pass to clamping circuit 58. In clamping circuits 56 and 58 the portions of sine wave are detected with respect to polarity and amplitude and are stretched in time. A bias amplifier 60, operating from the bias voltage generated to indicate an off target source, acts to clamp the detected right, left, up and down outputs at their respective existing levels whenever the true target signal is replaced by an off-target signal. The signals fed into clampers 56 and 58 are stretched so as to carry over the directional information from one scan cycle to the next. This stretching action also serves to keep any appreciable portion of an undesirable signal from getting through clamping circuits 56 and 58 to the ensuing directional control circuits before comparator 46 has time to build up an output to block the signal. A short delay network 62 may be inserted in the scan signal input circuit to sorting circuits 50 and 52 to further insure this action.

The right and left output signals from clamper 56 are fed to right-left differential amplifier 64, which generates a difference signal when the target is off the seeker axis in azimuth. DC adjuster and summing amplifier circuit 40 forms this signal into a single azimuth signal centered about ground potential. Similarly differential amplifier 66 and DC adjuster circuits 34 operate on the output signals from clamper 58 and generate an elevation signal centered about ground potential. To these azimuth and elevation signals the respective summing amplifiers 40 and 34 add signals from missile yaw indicator 68 and pitch indicator 70. The yaw and pitch signals should be centered about ground potential and are set to have approximately the same sensitivity (volts/degree) and polarity as the azimuth and elevation signals derived by the scanning action. The yaw and pitch signals should be controlled by bias amplifier 60 so that they begin from zero whenever the true target signal is interrupted by an off-target signal, and commence to indicate changes in missile orientation from that point. Then the output signals from the respective DC adjuster and summing amplifiers 34 and 40, will indicate the direction of the gated target with respect to the seeker axis; but when an off-target signal which does not meet the target directional conditions appear, these output signals are switched to a spacial reference so that any missile motions during the period of interruption do not result in a condition where the true target signal fails to meet the angle gating conditions when it is re-acquired. Yaw and pitch indicators 68 and 70 may either be the outputs of a single directional gyro which is clamped and unclamped under control of the output of bias amplifier 60, or they may be the respective outputs of integrator circuits which are clamped and unclamped from zero by the output of bias amplifier 60 and which when unclamped integrate the outputs of rate gyroscopes carried by the missile. Obviously many modifications and variations of the present invention are possible in the light of the above teachings. It is therefore to be understood that within the scope of the appended claims the invention may be practiced otherwise than as specifically described.

What is claimed is:

1. For use in a guided missile system of the conical scanning type an angle gating system comprising:
    a. a first input terminal for receiving a sine wave signal generated by the conical scanning of the seeker antenna in the direction of a target to be tracked,
    b. a second input terminal for receiving a sine wave reference signal representing the instantaneous position of the scanning device,
    c. a third input terminal for receiving a sine wave reference signal shifted ninety degrees in phase from the phase of the sine wave signal received at said second input terminal,
    d. right-left modulator circuit means coupled to said second input terminal for producing an output sine wave,
    e. up-down modulator circuit means coupled to said third input terminal for producing an output sine wave that is ninety degrees out-of-phase with the output sine wave from said right-left modulator,
    f. a summing network coupled to the outputs of said right-left and up-down modulator circuits means for generating an output sine wave memory signal,
    g. comparator circuit means coupled to said first input terminal and to the output of said summing network for generating an output signal whenever the amplitudes of the two inputs are of unequal values of a predetermined amount.

2. For use in a guided missile system of the conical scanning type an angle gating system comprising:
    a. a first input terminal for receiving a sine wave signal generated by the conical scanning of the seeker antenna in the direction of a target to be tracked,
    b. a second input terminal for receiving a sine wave reference signal representing the instantaneous position of the scanning device,
    c. a third input terminal for receiving a sine wave reference signal shifted 90° in phase from the phase of the sine wave signal received at said second input terminal,
    d. right-left modulator circuit means coupled to said second input terminal for producing an output sine wave,
    e. up-down modulator circuit means coupled to said third input terminal for producing an output sine wave that is ninety degrees out-of-phase with the output sine wave from said right-left modulator,
    f. a summing network coupled to the outputs of said right-left and up-down modulator circuits means for generating an output sine wave memory signal,
    g. comparator circuit means coupled to said first input terminal and to the output of said summing network for generating an output signal whenever the phases of the two inputs are of unequal values of a predetermined amount.

3. For use in a guided missile system of the conical scanning type an angle gating system comprising:
    a. a first input terminal for receiving a sine wave signal generated by the conical scanning of the seeker antenna in the direction of a target to be tracked,
    b. a second input terminal for receiving a sine wave reference signal representing the instantaneous position of the scanning device,
    c. a third input terminal for receiving a sine wave reference signal shifted ninety degrees in phase from the phase of the sine wave signal received at said second input terminal,
    d. right-left modulator circuit means coupled to said second input terminal for producing an output sine wave,
    e. up-down modulator circuit means coupled to said third input terminal for producing an output sine wave that is ninety degrees out-of-phase with the output sine wave from said right-left modulator,
    f. a summing network coupled to the outputs of said right-left and up-down modulator circuits means for generating an output sine wave memory signal,
    g. comparator circuit means coupled to said first input terminal and to the output of said summing network for generating an output signal whenever the amplitude and phases of the two inputs are of unequal values of a predetermined amount.

* * * * *